(12) United States Patent
Joginapally

(10) Patent No.: US 10,262,353 B1
(45) Date of Patent: Apr. 16, 2019

(54) METHOD AND SYSTEM TO ESTIMATE MOBILE DEVICE PERFORMANCE BASED ON PERSONAL BEHAVIOR PATTERNS

(71) Applicant: Symantec Corporation, Mountain View, CA (US)

(72) Inventor: Praveen Joginapally, Culver City, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 646 days.

(21) Appl. No.: 14/622,658

(22) Filed: Feb. 13, 2015

(51) Int. Cl.
*G06Q 30/06* (2012.01)
*H04W 8/22* (2009.01)
*H04W 4/60* (2018.01)

(52) U.S. Cl.
CPC ..... *G06Q 30/0629* (2013.01); *G06Q 30/0641* (2013.01); *H04W 4/60* (2018.02); *H04W 8/22* (2013.01)

(58) Field of Classification Search
CPC .......... G06Q 30/0629; G06Q 30/0641; H04W 4/003; H04W 8/22
USPC ....................................................... 707/707
See application file for complete search history.

(56) References Cited

U.S. PATENT DOCUMENTS

| 2005/0022063 A1* | 1/2005 | Grebenev | G06F 11/0751 714/38.1 |
| 2012/0016990 A1* | 1/2012 | Jayaraman | G06F 11/3409 709/226 |
| 2014/0024348 A1* | 1/2014 | Hurst | H04M 3/5232 455/414.1 |
| 2015/0199251 A1* | 7/2015 | Buendgen | G06F 9/4881 702/186 |
| 2015/0230108 A1* | 8/2015 | Sridhara | H04W 24/08 455/405 |
| 2015/0363289 A1* | 12/2015 | Brough | H04W 24/10 709/224 |

* cited by examiner

*Primary Examiner* — Mohammad S Rostami
*Assistant Examiner* — Saba Ahmed
(74) *Attorney, Agent, or Firm* — Maschoff Brennan

(57) ABSTRACT

A method for estimating mobile device performance is provided. The method includes accessing device information, application information and usage information from a plurality of mobile devices and receiving a user selection that indicates a type of mobile device and one or more applications. The method includes determining an impact the one or more applications cause to the selected type of mobile device, in terms of resources of the selected type of mobile device, based on the user selection and based on the device information, application information and usage information from the plurality of mobile devices. The method includes communicating information about the impact, in terms of the resources of the selected type of mobile device. A computer readable media and a system are also provided.

15 Claims, 7 Drawing Sheets

(F - Foreground, B - Background, W - WiFi, C - Cell, D - Data, S - Sent, P - Power, R - RAM, B - Battery)

| Process j | Foreground Time TFj | Background Time TBj |
|---|---|---|
| Data Sent Over WiFi | DSFWj in Bytes | DSBWj in Bytes |
| Data Sent Over Cell | DSFCj in Bytes | DSBCj in Bytes |
| Data Received Over WiFi | DRFWj in Bytes | DRBWj in Bytes |
| Data Received Over Cell | DRFCj in Bytes | DRBCj in Bytes |
| Power Usage | PFj in mA | PBj in mA |
| RAM Usage | RFj in MB | RBj in MB |
| Battery Drain | BFj in Percentage (Like 10 Percent Over a Period TFj) | BBj in Percentage |

FIG. 3A

METHOD AND SYSTEM TO ESTIMATE MOBILE DEVICE PERFORMANCE BASED ON PERSONAL BEHAVIOR PATTERNS

BACKGROUND

Mobile devices, such as cell phones, smart phones, touchscreen tablets and personal digital assistants (PDAs) are available in a wide variety of types (from various manufacturers and in various models) and with varying technical specifications, such as processor speed, battery capacity, random-access memory (RAM), storage memory, etc. Often, the user faces a bewildering decision as to which mobile device to purchase, and may have various applications in mind but unsure as to which device is most suited for personal use. A trial and error approach, namely purchasing a mobile device and trying it out for a while, then later deciding the device is not the best choice, is an expensive endeavor. Printed and online reviews of mobile devices provide some information to the user, but may not address all user concerns. Sales personnel have varying amounts of knowledge about the mobile devices, and purchasing a mobile device based on recommendations of sales personnel may be a hit-or-miss proposition.

It is within this context that the embodiments arise.

SUMMARY

In some embodiments, a method, performed by a processor, for estimating mobile device performance is provided. The method includes accessing device information, application information and usage information from a plurality of mobile devices and receiving a user selection that indicates a type of mobile device and one or more applications. The method includes determining an impact the one or more applications cause to the selected type of mobile device, in terms of resources of the selected type of mobile device, based on the user selection and based on the device information, application information and usage information from the plurality of mobile devices. The method includes communicating information about the impact, in terms of the resources of the selected type of mobile device. In some embodiments, the method operations may be embodied as instructions on a computer readable media.

In some embodiments, a system for mobile device performance estimating is provided. The system includes at least one server having an estimator module and a user interface generator. The estimator module is configured to couple to a database having device information, application information and usage information from a plurality of mobile devices. The user interface generator is configured to generate a user interface that offers mobile device and application performance estimation based on user selection of one of a plurality of types of mobile devices and user selection of one or more of a plurality of applications. The estimator module is configured to estimate resource usage of a user selected one of the plurality of types of mobile devices operating a user selected one or more of the plurality of applications, in accordance with input from the user interface and based on the device information, the application information and the usage information in the database. The estimator module is configured to communicate, via the user interface, the estimated resource usage of the user selected one of the plurality of types of mobile devices.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3A depicts information suitable for collection from mobile devices and inclusion in the database of FIG. 2 in accordance with some embodiments.

DETAILED DESCRIPTION

A system and related method for estimating mobile device performance relative to applications and resources of the mobile device are herein presented. With various embodiments of the system and method, a user can view a user interface offering mobile device and application performance estimation, and select a type of mobile device, and one or more applications. In some versions, the user enters or otherwise selects a usage pattern or planned usage of each application. The system estimates impact on resources of the selected mobile device, such as battery, network or memory usage, and displays the estimated impact on the user interface. The user can make changes in the selection of mobile device or applications, or enter new usage patterns, and the system updates the estimated impact.

As an example scenario, a user may have certain favorite applications and be contemplating purchase of a new mobile device, but not know the impact these applications will have on the new mobile device. A user may have a mobile device but have concerns about whether installing a new application on the device will overly burden the resources of the mobile device. Through consideration of the estimated impact of applications on mobile device resources, as available through use of the various embodiments described herein, the user is better informed to make purchasing decisions about mobile devices and applications.

Figure 1:
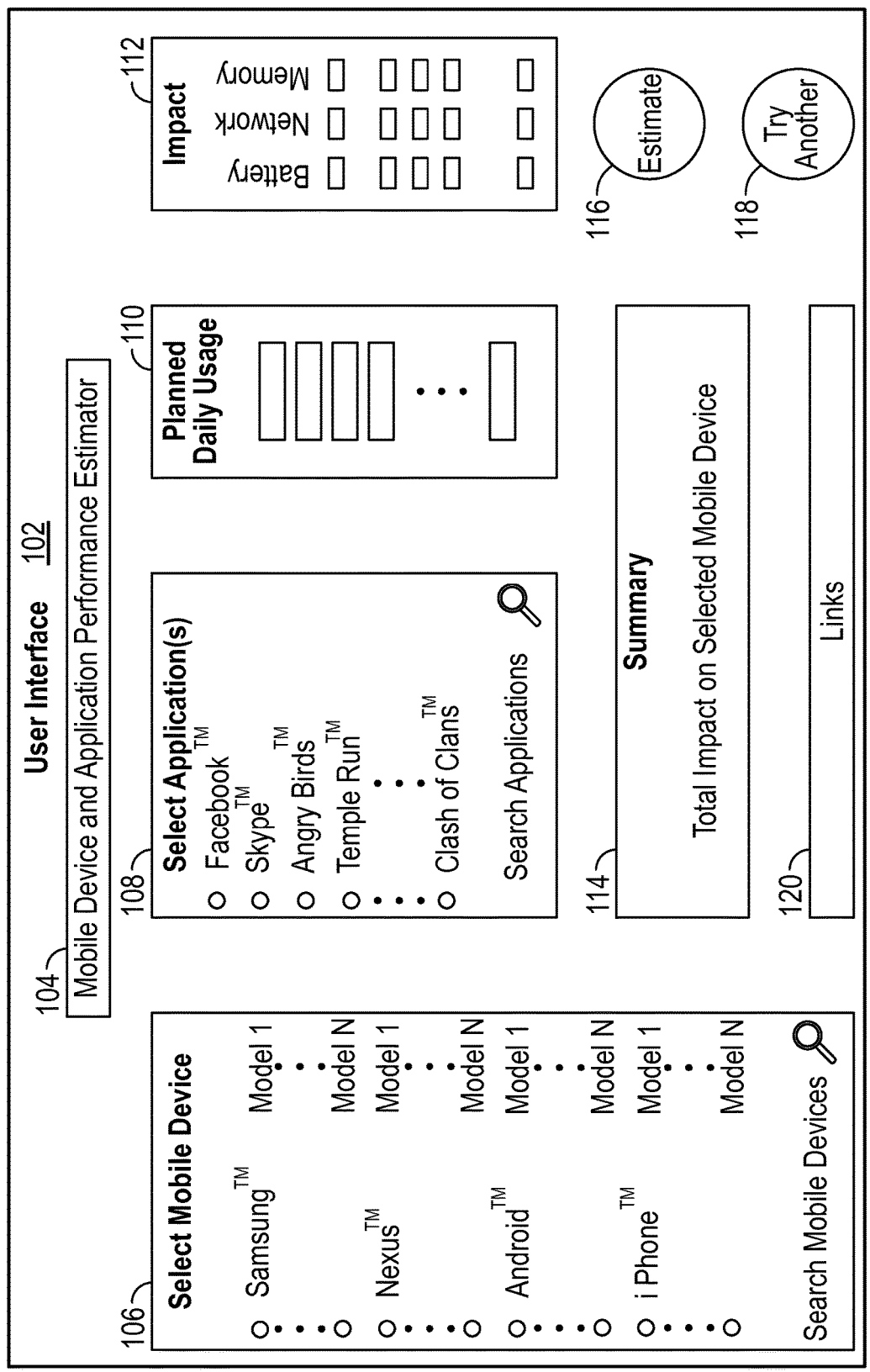
FIG. 1 is a depiction of a user interface screen in accordance with some embodiments in which a user selects a mobile device, various applications, and planned usage, and sees an estimate of the impact the selected applications have on resources of the selected mobile device.

FIG. 1 is a depiction of an example user interface screen in accordance with some embodiments, in which a user selects a mobile device, various applications, and planned usage, and sees an estimate of the impact the selected applications have on resources of the selected mobile device. It should be appreciated that the screen shown in FIG. 1 illustrates various possibilities, and that variations and further embodiments are readily developed in keeping with the teachings herein. The user interface 102 has a title section 104, which explains the purpose and function of the user interface 102. For example, a title could be, "mobile device and application performance estimator" or other suitable title. There are multiple user input fields 106, 108, 110, in which the user can click on various items, select from a menu, select from a drop-down menu, enter by typing, or otherwise indicate a user selection via the user interface 102. In a first user input field 106, various types of mobile devices are shown or represented (e.g., in text or graphical formats), such as models of mobile devices from various manufacturers (e.g., Samsung™, Nexus™, Android™, iPhone™), etc. In a second user input field 108, various applications suitable for mobile devices are shown or represented, such as social media applications, games, communication applications (e.g., Facebook™, Skype™, Angry Birds™, Temple Run™, Clash of Clans™, Norton Mobile Security™), etc. In a third user input field 110, fields are shown for user entry of hypothetical, planned or actual usage patterns (i.e., a specified usage pattern) for the selected application or applications. To use the user input fields 106, 108, 110, the user selects a mobile device in the first user input field 106, selects one or more applications in the second user input field 108, and selects or enters usage information, such as ten minutes per day, one hour per week, or five hours per month, for each application selected. The example depicted requests user entry of planned daily usage, and further embodiments could request user entry or selection of other usage patterns.

In some embodiments, once sufficient information has been indicated by the user, in the user interface 102, the user interface 102 then displays the impact that the selected application or applications have on the selected mobile device. In further embodiments, the user clicks on or otherwise selects a soft button 116, for example labeled "estimate", or hits the enter key, which triggers the determination and display of the mobile device resource impact information. In some embodiments, the display of the mobile device resource impact information updates automatically with changes in user selections. In other embodiments, the user clicks on or otherwise selects another soft button 118, for example labeled "try another", which triggers the determination and display of the mobile device resource impact information based on the new changes in user selections. Further mechanisms for triggering determination, display and updates are readily devised.

The impact information can be displayed in various formats, and include various types of information. In the embodiment shown, a first output field 112 shows mobile device resource impact on a per application basis, for battery usage, network usage and memory usage of the selected mobile device. For example, using one specified application for thirty minutes per day could be shown as depleting 10% of the battery capacity in a day. The same use could also be shown as consuming a particular number of megabytes (i.e., network usage) in a day (or gigabytes per month, for comparison with mobile device data plans). And, the half hour use of the specified application could be shown as making use of a particular amount of RAM or storage memory of the mobile device in a day. Each application selected would have similar statistics displayed in the first output field 112. Further parameters for the impact information are readily developed in keeping with the teachings herein. In some embodiments, a second output field 114 shows a summary, or a total (i.e., overall) impact on resources of the selected mobile device, for all the applications selected. In some embodiments, a message could be displayed in the second output field 114 informing the user that the selected mobile device is fully capable of operating the selected applications for the selected usage pattern. A further message could be displayed informing the user that the selected mobile device is not capable of operating all of the selected applications for a selected usage pattern, if such is the case (e.g., the selected type of mobile device lacks sufficient memory or storage, or has insufficient battery capacity to last for an entire day with this usage pattern of these applications). The second output field 114 could also show how long the battery of the selected mobile device can supply power under the selected application usage pattern before needing recharging, how often the battery would need recharging, or other information about usage effects that operating the selected applications has on the resources of the selected mobile device.

Extra items included within the user interface 102 could include search fields for searching for mobile devices, in the first user input field 106, or for searching for applications, in the second user input field 108. One or more links to other webpages could be offered in a links field 120. For example, responsive to researching a mobile device or an application, a link could send a user to a webpage offering sales of mobile devices or downloads of applications. It should be appreciated that the user interface 102 could be displayed on various user devices, such as computers or mobile devices of various types.

Figure 2:
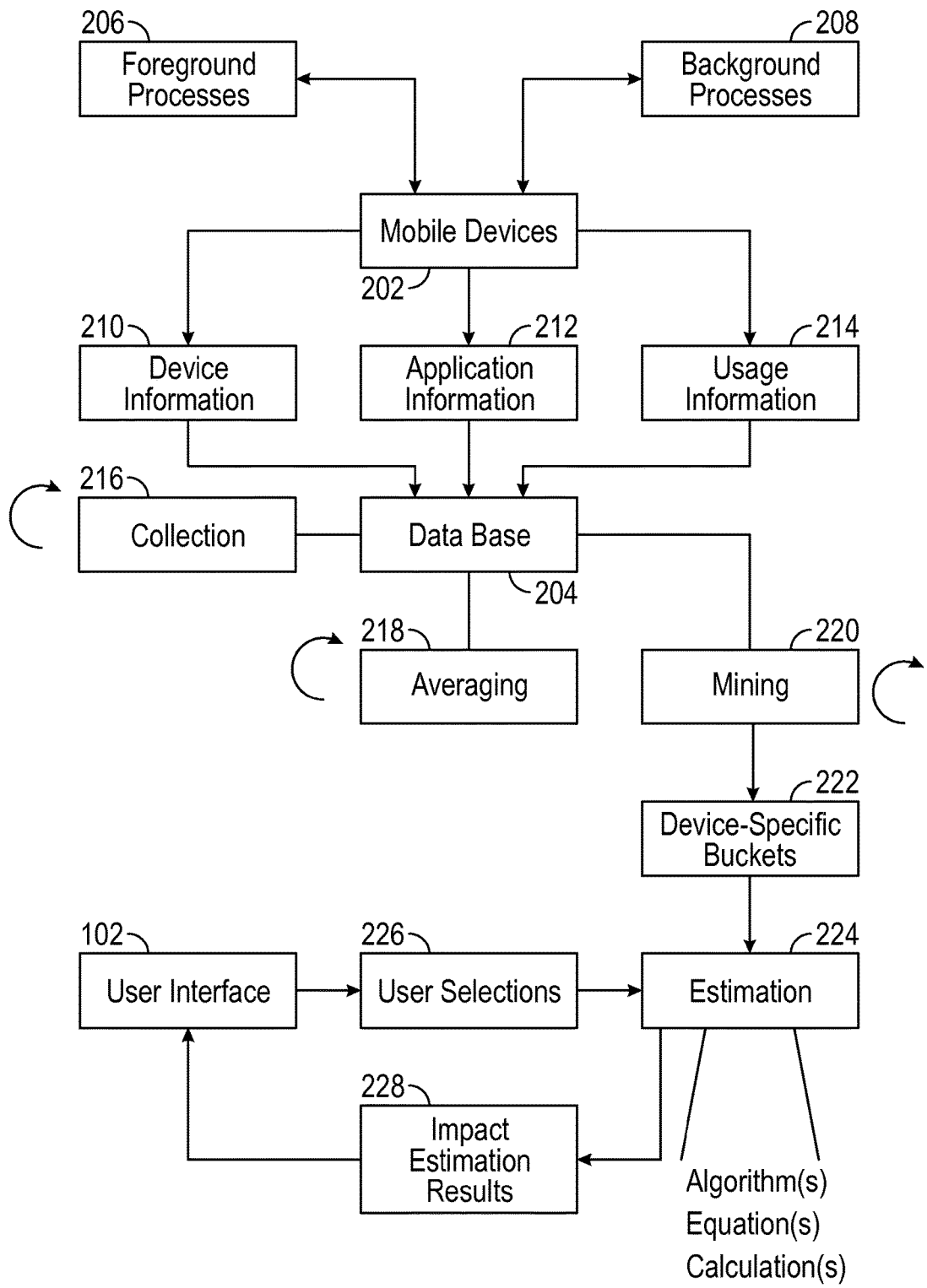
FIG. 2 is a process and action diagram, showing data collection and mining of information from a large number of mobile devices, and estimation of the impact of the user selected applications on the selected mobile device in accordance with some embodiments.
Figure 3B:
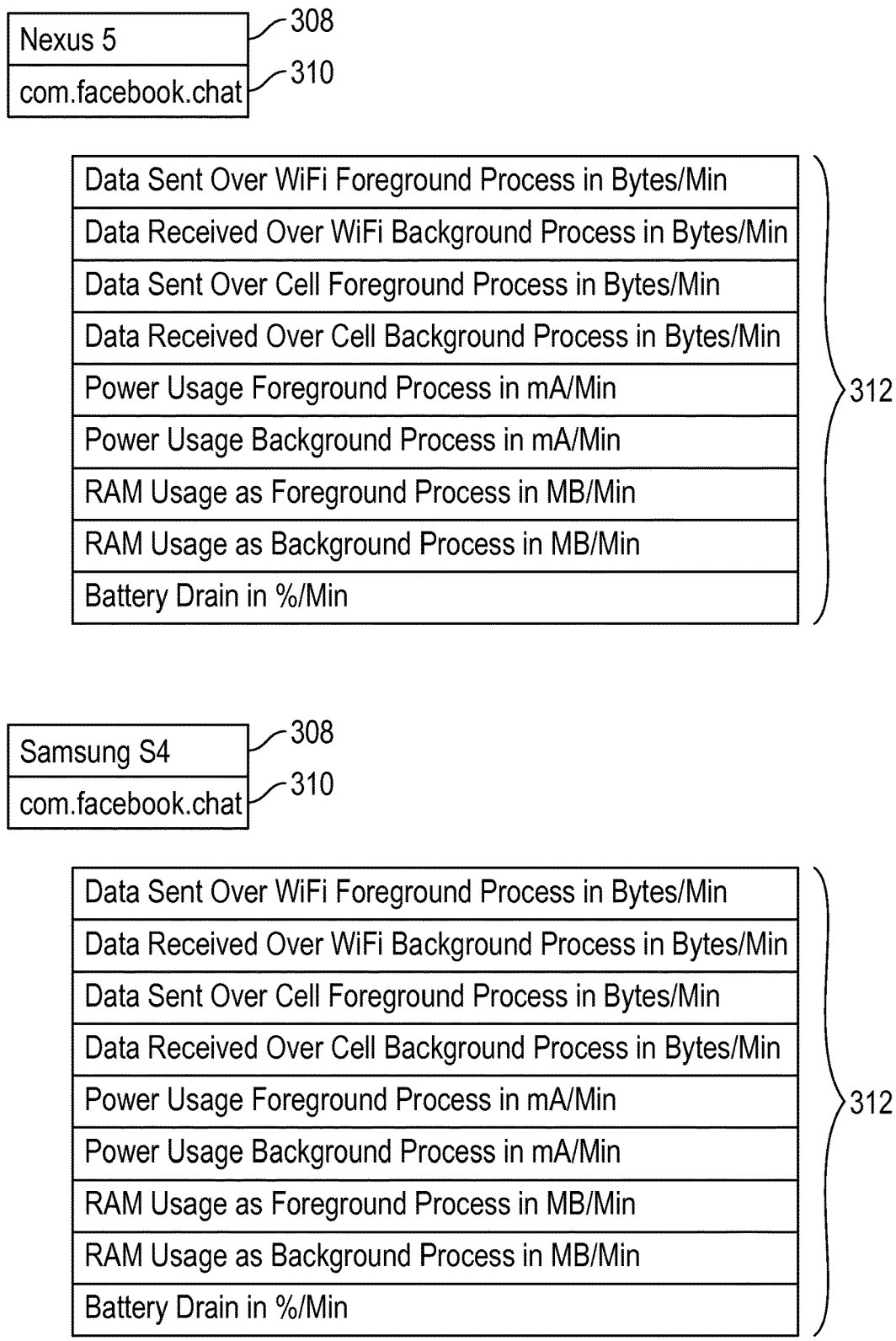
FIG. 3B is an example of device-specific information relative to two types of mobile devices and a particular application, based on the collected information depicted in FIG. 3A in accordance with some embodiments.

FIG. 2 is a process and action diagram, showing data collection 216 and mining 220 of information from a large number of mobile devices 202, and estimation 224 of the impact of the user selected applications on the selected mobile device. The processes and actions depicted could be implemented on one or more servers or other computing devices, in a physical computing or virtual computing environment. In one embodiment, the database 204 is implemented as the Norton Mobile Insight™ database. An ongoing collection 216 process collects device information 210, application information 212, and usage information 214 from mobile devices 202, which are executing foreground processes 206 and background processes 208. The mobile devices 202 could number in the thousands, millions or billions. Examples of such information collected by the collection 216 process into the database 204 are shown in FIGS. 3A and 3B. An ongoing averaging process 218 averages the collected information, in the database 204. This protects anonymity of users and makes averaged information available for data mining 220. An ongoing mining process 220 data mines the collected and averaged information into device-specific buckets 222, i.e., device-specific information in various categories. Examples of this are shown in FIG. 3B.

A user interacts with the user interface 102, as described above with reference to FIG. 1. User selections 226 of a type of mobile device, one or more applications, and usage pattern are relayed (e.g., via a network) from the user interface 102 to an estimation 224 process. The estimation process 224 applies one or more algorithms, equations or calculations to the user selections 226 and the data mined information in the device-specific buckets 222. Results of the estimation process 224, shown here as impact estimation results 228, are relayed back to the user interface 102 (e.g., via a network), and are displayed on the user interface 102 as described above with reference to FIG. 1. The user has the option of changing the user selections 226, and repeating the estimation process 224 to obtain further impact estimation results 228 via the user interface 102. The impact estimation results 228 show the usage effect, i.e., impact, which the selected application or applications and selected usage pattern of the application or applications have on or cause to resources of the selected mobile device.

As an example of part of the estimation process 224, a user could indicate usage of a particular application for a particular amount of time per day on a particular type of mobile device. The estimation process 224 draws from data mined information about that application on other mobile devices of the same type, and calculates average resource utilization projected for that type of mobile device based on that specified usage pattern. The process is repeated for each type of resource. This process is then repeated for other applications selected by the user. Such calculations can proceed sequentially, in parallel, or in combinations thereof as readily devised by programmers for various computing environments.

FIG. 3A depicts information suitable for collection from mobile devices and inclusion in the database of FIG. 2. Various information fields 302, 304, 306 categorize the information according to process, in a first information field 302, according to foreground time, a second information field 304, and according to background time, in a third information field 306. The information would be organized according to mobile device and application, in various embodiments. For example, information for a particular type of mobile device and particular application and a specific process of the application could include data sent over Wi-Fi (wireless fidelity), data sent over a cellular network, data received over Wi-Fi, data received over a cellular network, power usage, RAM usage and battery drain in percentage over a time span, in the first information field 302. These can be applied as categories for the second information field 304 and third information field 306. Information as above could include data sent in a foreground process over Wi-Fi, in bytes, data sent as a foreground process over a cellular network, in bytes, data received as a foreground process over Wi-Fi, in bytes, data received as a foreground process over a cellular network, in bytes, power for the foreground process in milliamps, RAM for the foreground process, in megabytes, and foreground process battery drain in percentage over a time span, in the second information field 304. Information as above could include data sent in a background process over Wi-Fi, in bytes, data sent in a background process over a cellular network, in bytes, data received in a background process over Wi-Fi, in bytes, data received in a background process over a cellular network, in bytes, power supplied by the battery for the background process, in milliamps, RAM used by the background process, in megabytes, and battery drain for the background process in percentage over a time span, in the third information field 306.

FIG. 3B is an example of device-specific information relative to two types of mobile devices and a particular application, based on the collected information depicted in FIG. 3A. For the Nexus 5™ type of mobile device in the device field 308, using the application for Facebook™ and the chat process in the process field 310, the information field 312 could include data sent over Wi-Fi in a foreground process in bytes per minute, data received over Wi-Fi in a background process in bytes per minute, data sent over a cellular network in a foreground process in bytes per minute, data received over a cellular network in a background process in bytes for minute, power usage for the foreground process in milliamps per minute, power usage in the background process in milliamps per minute, RAM usage as the foreground process in megabytes per minute, RAM usage as the background process in megabytes per minute, and battery drain in percent per minute. Related information is shown in the information field 312 for the Samsung S4™ type of mobile device in the device field 308, using the application for Facebook™ and the check process in the process field 310, in a further example in FIG. 3B. The information shown in FIGS. 3A and 3B can be organized in various formats in the database 204, such as tables, lists, pointers, linked data, etc.

Figure 4:
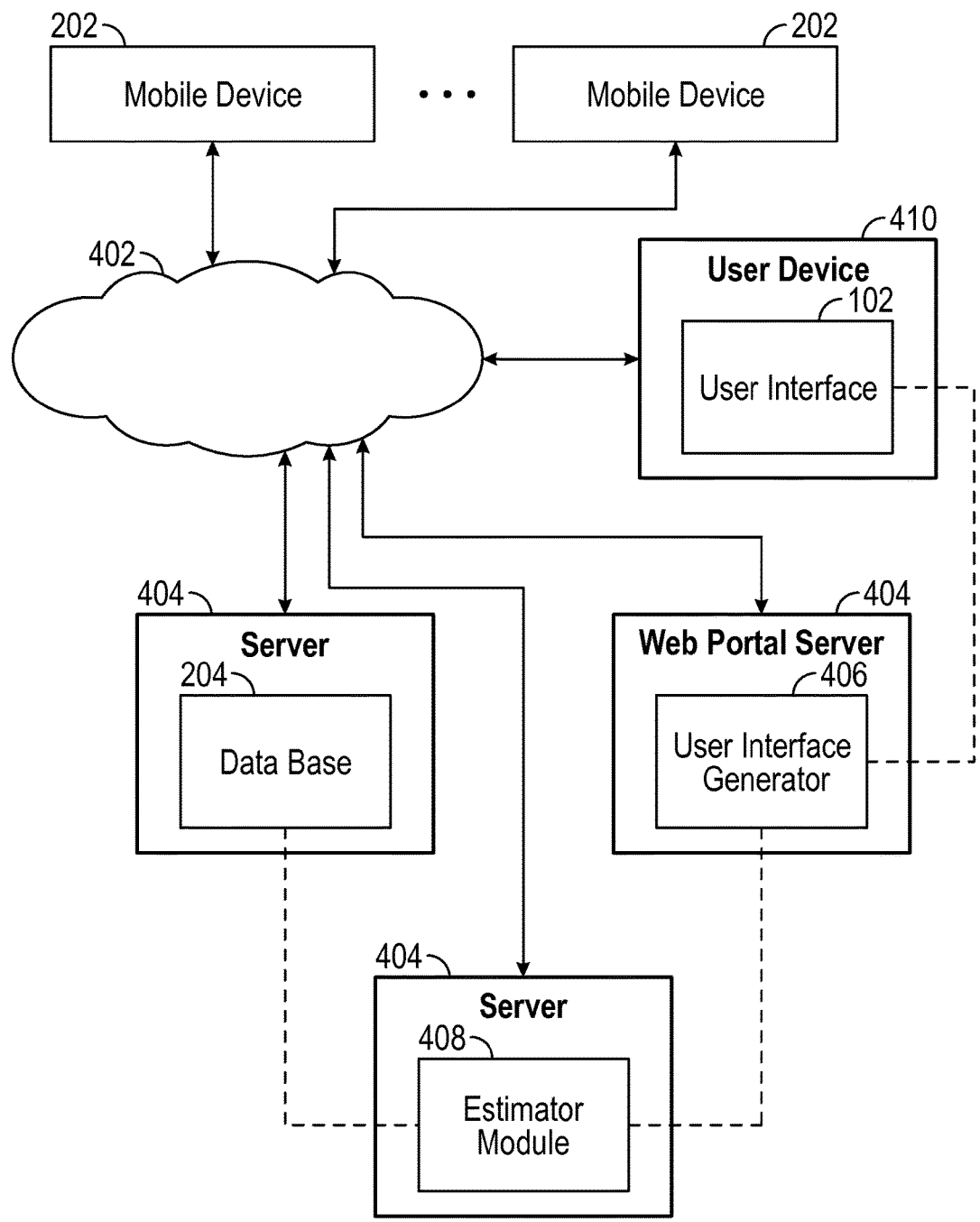
FIG. 4 is a diagram of a system for mobile device performance estimating, depicting an estimator module, a database and a user interface generator in one or more servers, with the system performing the processes and actions of FIG. 2 using the user interface of FIG. 1 in accordance with some embodiments.

FIG. 4 is a diagram of a system for mobile device performance estimating, depicting an estimator module 408, a database 204 and a user interface generator 406 in one or more servers 404, with the system performing the processes and actions of FIG. 2 using the user interface 102 of FIG. 1. The three servers 404 depicted could be combined into one server 404, two servers 404, or spread out into four or more servers 404, in various embodiments. These could be physical servers or virtual servers (e.g., in a virtual computing environment). Various couplings among the components in the servers 404, and the user interface 102, are shown in dashed lines. In the embodiment shown, a first server 404 has the database 204, and collects the information from the mobile devices 202 via a network 402, such as the Internet. A second server 404 acts as a web portal server, and has the user interface generator 406. The user interface generator 406 creates the user interface 102, which is sent through the network 402 to a user device 410. The user device 410 could be a computer, or a mobile device 202, etc. The user interacts with the user interface 102 on the user device 410, and user selections 226 (see FIG. 2) are sent through the network 402 to the second server 404 and the user interface generator 406. The user interface generator 406 relays user selections 226 to the third server 404, which has the estimator module 408. Accessing the database 204, the estimator module 408 analyzes the user selections 226 and the information in the database 204 (see FIGS. 2, 3A and 3B), and produces the impact estimation results 228 (as in FIG. 2). The impact estimation results 228 are sent through the user interface generator 406 (via the network 402) to the user interface 102, as seen on the user device 410.

Figure 5:
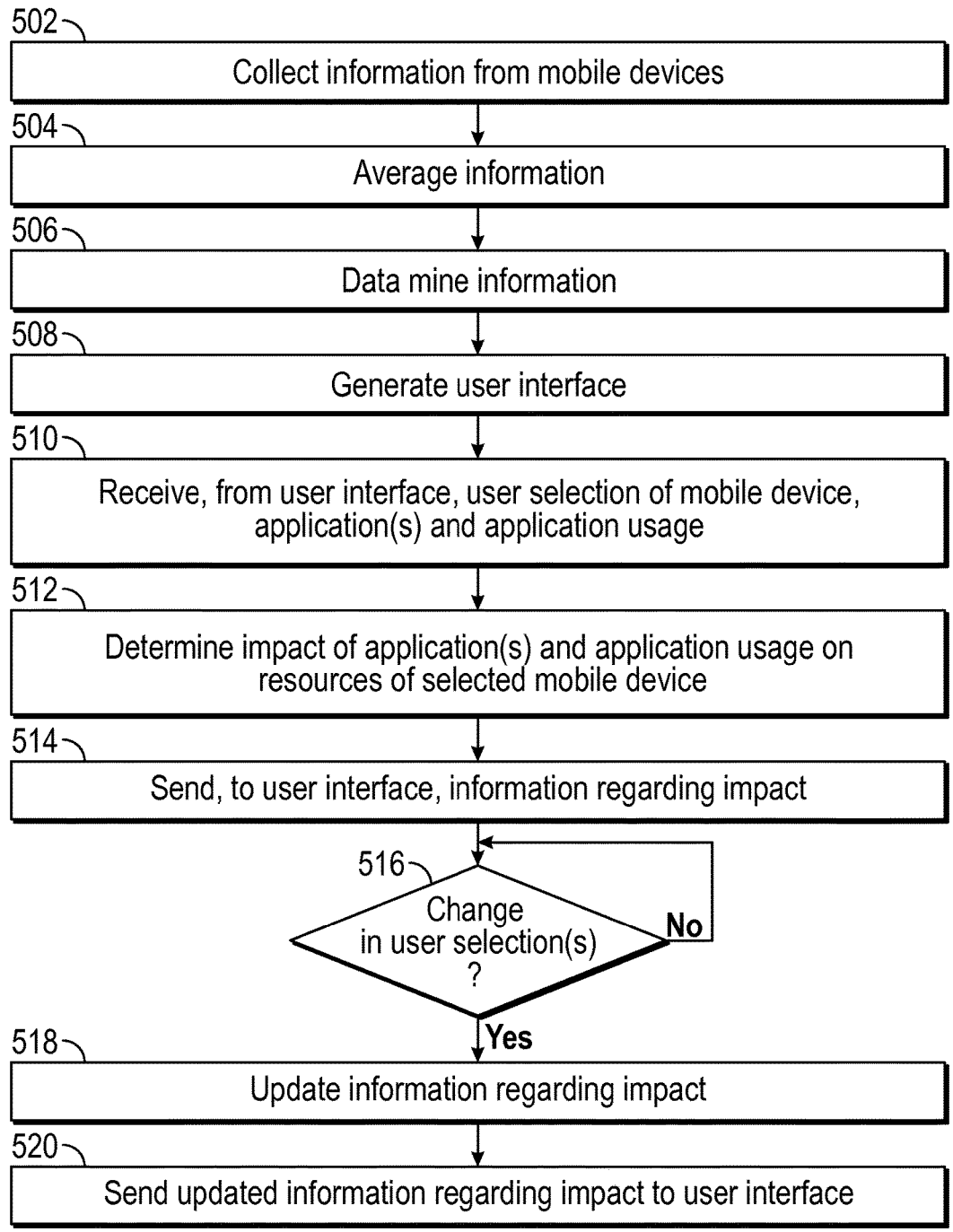
FIG. 5 is a flow diagram of a method for estimating mobile device performance, which can be practiced on or by the system shown in FIGS. 1-4 in accordance with some embodiments.

FIG. 5 is a flow diagram of a method for estimating mobile device performance, which can be practiced on or by the system shown in FIGS. 1-4. The method can be performed by one or more processors, such as processors of one or more servers as discussed above. The method can be separated into two or more processes, each process operating within a server, or within multiple servers. In an action 502, information is collected from mobile devices. For statistical purposes, this should be a large number of mobile devices. The information, such as described above with reference to FIGS. 3A and 3B can be collected into a database, in various formats. In an action 504, the information is averaged. The information is data mined, in an action 506. This could include sorting the information according to applications, types of mobile devices, foreground and background processes, and other categories.

In an action 508, a user interface is generated. A user interface such as discussed with reference to FIG. 1, or variation thereof, would be suitable. In an action 510, a user selection of a mobile device, one or more applications, and application usage is received from the user interface. These selections indicate the type of mobile device and the application(s) of interest to a user, and the usage of these. In an action 512, the impact that the selected application(s) and application usage have on resources of the selected mobile device is determined. Such determination can be made by an estimator module, as described with reference to FIG. 4, using an estimation process as described with reference to FIG. 2. Information regarding this impact is sent to the user interface, in an action 514. The information can be presented in various formats, and include various values of various parameters, such as shown in FIG. 1. In a decision action 516, it is determined whether there is a change in one or more user selections. If there is no change, the decision action loops to itself (or in some embodiments branches elsewhere). If there is change, the answer to the question posed in the decision action 516 is yes, and flow proceeds to the action 518. In the action 518, the information regarding the impact on resources of the selected mobile device is updated. The updated information regarding the impact on resources of the selected mobile device is sent to the user interface, in an action 520.

Figure 6:
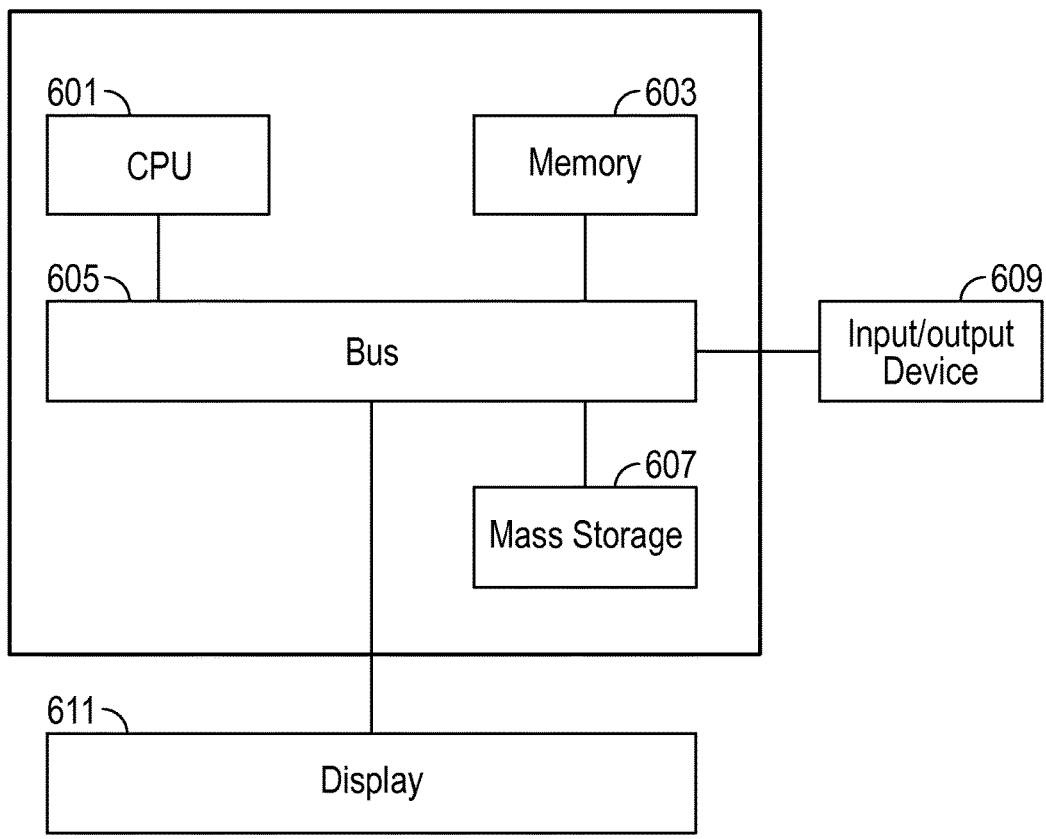
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for estimating mobile device performance in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, performed by a processor, for estimating mobile device performance, comprising:
   accessing device information, application information, and usage information from a plurality of mobile devices;
   receiving a user-selected type of mobile device, a user-selected application, and a user-selected planned usage pattern for the user-selected application, prior to installing and operating the user-selected application on a mobile device having a type that matches the user-selected type of mobile device;
   prior to installing and operating the user-selected application on a mobile device having a type that matches the user-selected type of mobile device, estimating a resource usage that operating the user-selected application would cause to the user-selected type of mobile device were the user-selected application to be installed and operated in the future on the mobile device having the type that matches the user-selected type of mobile device, in terms of resources of the user-selected type of mobile device, based on the user-selected planned usage pattern for the user-selected application and based on the accessed device information, application information, and usage information from the plurality of mobile devices;
   estimating that the user-selected type of mobile device would be capable of operating the user-selected application for the user-selected planned usage pattern were the user-selected application to be installed and operated in the future on the mobile device having the type that matches the user-selected type of mobile device;
   communicating information about the resource usage, in terms of the resources of the user-selected type of mobile device, including the estimation that the user-selected type of mobile device would be capable of operating the user-selected application for the user-selected planned usage pattern; and
   in response to the estimation that the user-selected type of mobile device would be capable of operating the user-selected application for the user-selected planned usage pattern, installing and operating the user-selected application on the mobile device having the type that matches the user-selected type of mobile device.

2. The method of claim 1, wherein the receiving of the user selection and the communicating of the information about the resource usage are via a user interface.

3. The method of claim 1, wherein the accessing of the device information, the application information, and the usage information from the plurality of mobile devices comprises:
collecting into a database the device information from the plurality of mobile devices, regarding which types of mobile devices are in operation among the plurality of mobile devices;
collecting into the database the application information from the plurality of mobile devices, regarding which applications are in operation among the plurality of mobile devices;
collecting into the database the usage information from the plurality of mobile devices, regarding usage of applications, foreground processes and background processes, among the plurality of mobile devices; and
obtaining the device information, the application information and the usage information from the database.

4. The method of claim 1, further comprising:
averaging the device information, the application information and the usage information from the plurality of mobile devices;
mining the device information, the application information and the usage information from the plurality of mobile devices as averaged; and
organizing the mined device information, application information and usage information into mobile device-specific information, wherein the estimating of the resource usage that operating the user-selected application would cause to the user-selected type of mobile device is based on the organized, mined device information.

5. The method of claim 1, wherein the estimating of the resource usage comprises estimating, for operation of the user-selected application on the user-selected type of mobile device, battery usage of the user-selected type of mobile device.

6. The method of claim 1, wherein the communicating of the information about the resource usage comprises:
communicating, via a user interface, at least one of: estimated battery usage for operation of the user-selected application on the user-selected type of mobile device, estimated network usage for operation of the user-selected application on the user-selected type of mobile device, or estimated memory usage for operation of the user-selected application on the user-selected type of mobile device.

7. A tangible, non-transitory, computer-readable media having instructions thereupon which, when executed by a processor, cause the processor to perform a method comprising:
receiving a user-selected type of mobile device, a user-selected application, and a user-selected planned usage pattern for the user-selected application prior to installing and operating the user-selected application on a mobile device having a type that matches the user-selected type of mobile device;
accessing device information, application information, and usage information collected from a plurality of mobile devices;
prior to installing and operating the user-selected application on a mobile device having a type that matches the user-selected type of mobile device, estimating a resource usage that operating the user-selected application is projected to have on resources of the user-selected type of mobile device were the user-selected application to be installed and operated in the future on the mobile device having the type that matches the user-selected type of mobile device, based on the user-selected planned usage pattern for the user-selected application and based on the accessed device information, application information, and usage information;
estimating that the user-selected type of mobile device would be capable of operating the user-selected application for the user-selected planned usage pattern were the user-selected application to be installed and operated in the future on the mobile device having the type that matches the user-selected type of mobile device;
communicating regarding the resource usage including the estimation that the user-selected type of mobile device would be capable of operating the user-selected application for the user-selected planned usage pattern; and
in response to the estimation that the user-selected type of mobile device would be capable of operating the user-selected application for the user-selected planned usage pattern, installing and operating the user-selected application on the mobile device having the type that matches the user-selected type of mobile device.

8. The computer-readable media of claim 7, wherein the method further comprises:
generating a user interface that represents a plurality of mobile devices and a plurality of applications for user selection, wherein the received user-selected type of mobile device and the received user-selected application is via the user interface and based on the represented plurality of mobile devices and the represented plurality of applications.

9. The computer-readable media of claim 7, wherein the method further comprises:
generating a user interface that offers mobile device and application performance estimation, wherein the receiving and the communicating regarding the resource usage are via the user interface.

10. The computer-readable media of claim 7, wherein the resource usage includes, on a per application basis, an amount of battery usage.

11. The computer-readable media of claim 7, wherein the accessing includes accessing a database having the device information, the application information, and the usage information collected from the plurality of mobile devices.

12. The method of claim 1, wherein the estimating of the resource usage comprises estimating, for operation of the user-selected application on the user-selected type of mobile device, network usage of the user-selected type of mobile device.

13. The method of claim 1, wherein the estimating of the resource usage comprises estimating, for operation of the user-selected application on the user-selected type of mobile device, memory usage of the user-selected type of mobile device.

14. The computer-readable media of claim 7, wherein the resource usage includes, on a per application basis, an amount of network usage.

15. The computer-readable media of claim 7, wherein the resource usage includes, on a per application basis, an amount of memory usage.

* * * * *